(12) United States Patent
Jöngren et al.

(10) Patent No.: US 8,578,232 B2
(45) Date of Patent: Nov. 5, 2013

(54) HARQ PROCESS CONTINUATION AFTER CQI-ONLY REPORT

(75) Inventors: George Jöngren, Stockholm (SE); Magnus Lindström, Sollentuna (SE); Henning Wiemann, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 351 days.

(21) Appl. No.: 13/059,843

(22) PCT Filed: Jan. 30, 2009

(86) PCT No.: PCT/SE2009/050096
§ 371 (c)(1), (2), (4) Date: Feb. 18, 2011

(87) PCT Pub. No.: WO2010/021580
PCT Pub. Date: Feb. 25, 2010

(65) Prior Publication Data
US 2011/0145672 A1 Jun. 16, 2011

Related U.S. Application Data

(60) Provisional application No. 61/089,950, filed on Aug. 19, 2008.

(51) Int. Cl.
*H03M 13/00* (2006.01)
(52) U.S. Cl.
USPC .................................... 714/751; 370/329
(58) Field of Classification Search
USPC ................... 714/348, 751; 370/329
See application file for complete search history.

(56) References Cited

U.S. PATENT DOCUMENTS

| | | | |
|---|---|---|---|
| 7,359,345 B2 * | 4/2008 | Chang et al. | 370/322 |
| 7,499,417 B2 * | 3/2009 | Kim et al. | 370/310 |
| 7,509,554 B2 * | 3/2009 | Lohr et al. | 714/748 |
| 7,594,153 B2 * | 9/2009 | Kim et al. | 714/751 |
| 7,710,938 B2 * | 5/2010 | Choi et al. | 370/342 |

(Continued)

FOREIGN PATENT DOCUMENTS

EP     1557967 A1     7/2005

OTHER PUBLICATIONS

Cam, R. et al. "Throughput Analysis of Some ARQ Protocols in the Presence of Feedback Errors." IEEE Transactions on Communications, vol. 45, No. 1, Jan. 1997.

(Continued)

*Primary Examiner* — Esaw Abraham
(74) *Attorney, Agent, or Firm* — Coats & Bennett, P.L.L.C.

(57) ABSTRACT

Techniques for controlling synchronous HARQ retransmissions are disclosed, in which non-adaptive retransmissions scheduled for a first transmission time interval are automatically deferred to a later transmission time interval in the event that a control message prohibiting the retransmission during the first transmission interval is received. In an exemplary method, a NACK message is received (320) in response to a previous data transmission corresponding to a stop-and-wait HARQ process, and a synchronous HARQ retransmission is scheduled (330) for a first transmission interval in response. A control message indicating that data for the stop-and-wait HARQ process may not be sent during the first transmission interval is received, and the synchronous HARQ retransmission is automatically deferred (350) to a second transmission interval, responsive to the control message. An explicit grant is not required to trigger the retransmission during the second transmission interval.

14 Claims, 4 Drawing Sheets

(56) References Cited

U.S. PATENT DOCUMENTS

| | | |
|---|---|---|
| 7,764,661 B2* | 7/2010 | Heo et al. .............. 370/342 |
| 7,783,949 B2* | 8/2010 | Lohr et al. .............. 714/751 |
| 2003/0039209 A1 | 2/2003 | Webber |
| 2004/0064775 A1 | 4/2004 | Gaskill et al. |

OTHER PUBLICATIONS

Ericsson, "Uplink synchronous HARQ and RACH", 3GPP TSG RAN WG2 #61, Feb. 11-15, 2008, Sorrento, Italy, Tdoc R2-080767.

LG Electronics, "Node B scheduling of HARQ retransmission", 3GPP TSG RAN WG1 Ad Hoc Meeting, Jan. 27-30, 2004, Espoo, Finland, R1-040022.

Catt et al., "Proposals on the synchronous HARQ in LTE TDD", 3GPP TSG-RAN WG2#55, Oct. 9-13, 2006, Seoul, Korea, R2-062932.

NEC, "Compressed mode interactions", 3GPP TSG-RAN Working Group 2 #46bis, Apr. 4-8, 2005, Beijing, China, R2-050901.

Yudong, Y. et al., "A HSDPA adaptive channel quality feedback technology based on NACK," Shanxi Electric Technology, Apr. 30, 2006.

CN Search Report issued Feb. 19, 2013 in re CN Application No. 200980132480.7 filed Jan. 30, 2009.

* cited by examiner

HARQ PROCESS CONTINUATION AFTER CQI-ONLY REPORT

TECHNICAL FIELD

The present invention relates generally to data communications in wireless communication systems, and in particular relates to methods and apparatus for suspending an automatic repeat request (ARQ) process in wireless communication systems using a stop-and-wait ARQ protocol.

BACKGROUND

The $3^{rd}$-Generation Partnership Project (3GPP) has developed a set of standards for a third-generation (3G) wireless communications system referred to as the Evolved-UMTS Terrestrial Radio Access Network (E-UTRAN) or the Long-Term Evolution (LTE) system. Parts of the LTE specifications define a medium access control (MAC) layer that uses a multi-process, stop-and-wait, hybrid automatic repeat-request (HARQ) protocol for data transmission between the LTE base station (evolved Node-B, or eNodeB) and a user mobile device (user equipment, or UE).

In LTE and other systems that use multi-process HARQ, each data packet sent from a transmitter to a corresponding receiver is associated with an active HARQ process. The receiving entity provides feedback indicating successful or unsuccessful reception of the data associated with a process and, based on the received feedback, the transmitting entity attempts to perform a retransmission. In LTE systems in particular, the base station transmits control signaling to provide information about the successful reception of (or failure to receive) the data associated with an uplink HARQ process; this control signaling is processed by the physical layer entity at the UE and provided to the MAC layer. If the control signaling indicates a failure to receive the data associated with a given process, the MAC layer in turn delivers a retransmission packet to the physical layer.

In LTE systems, the base station generally explicitly assigns transmission resources (one or more OFDM resource blocks, for one or multiple time intervals) to a terminal for both uplink and downlink transmissions, and determines the transmission format (modulation and coding scheme) to be used. For LTE uplink transmissions, HARQ retransmissions may be non-adaptive (i.e., using the same transmission resources and transmission format as used for the original transmission), or adaptive (i.e., one or both of the transmission resources and transmission format are explicitly modified by the base station). The specifics of each retransmission are controlled based on the physical layer signaling from the base station to the mobile terminal.

In more detail, an LTE mobile terminal receives uplink grant information via the Physical Downlink Control Channel (PDCCH). The grant message specifies the HARQ process ID, type of transmission (new/retransmission), redundancy version, etc. ACK/NACK messages corresponding to the HARQ processes are sent via the Physical HARQ Indicator Channel (PHICH). However, an explicit grant for a given process (received on the PDCCH) overrides the ACK/NACK messages, so that the ACK/NACK status is ignored if a PDCCH grant is received. As noted above, a PDCCH grant explicitly specifies the transmission resources and transmission format, and thus may specify an adaptive retransmission for a given HARQ process.

If a PDCCH message for a given process is not received, then the HARQ feedback (ACK/NACK) is considered. In particular, if a NACK is received then a synchronous non-adaptive retransmission is scheduled for the next transmission time interval assigned to that process. If an ACK is received, then no non-adaptive retransmission is planned. However, the buffered data for that HARQ process is preserved until a PDCCH grant for that process is eventually received. As a result, a subsequent grant may request a retransmission of the HARQ process data (even if an ACK was previously received), or may grant resources for a transmission of new data for the HARQ process. Those skilled in the art will appreciate that the former grant can be viewed as an implicit NACK, while the latter is an implicit ACK. The skilled practitioner will further appreciate that this procedure allows for rapid recovery from several signaling error scenarios, such as ACK-to-NACK and NACK-to-ACK reception errors.

LTE base stations may occasionally request that the mobile terminal transmit physical layer information, such as channel quality data. The radio link resources (e.g., in time and frequency) for transmitting such additional information elements may be pre-configured or allocated dynamically, e.g., on the Physical Uplink Control Channel (PUCCH). The base station may also determine whether the terminal may send only the requested information element(s) in a given transmission time interval, or whether the mobile terminal may multiplex the information elements with other data, such as the data from a current stop-and-wait HARQ process. The LTE base station may signal this decision to the terminal using a dedicated control indicator that is associated with other physical layer control information provided by the base station to the terminal. For convenience, this control indicator is called a CQI-only indicator in the discussion that follows, although those skilled in the art will appreciate that this indicator (or other flag or indicator) may be used to indicate the exclusive transmission of other physical layer information elements, such as a power headroom report.

If the base station indicates to the terminal that the requested information element must not be multiplexed with data, the terminal must suspend an active process if that process has data pending for retransmission, e.g., via a non-adaptive retransmission. Furthermore, a mechanism is needed for resuming the pending process at the next appropriate transmission opportunity. According to a conventional solution, upon receiving an indication that only requested information elements may be transmitted during a transmission time interval corresponding to a pending HARQ retransmission, the physical layer of the mobile terminal indicates a positive feedback (ACK) to the LTE MAC layer, which in turn suspends the HARQ process. As noted above, the HARQ process buffer is retained even upon receipt of an ACK, and is flushed only upon receipt of an uplink grant indicating that new data should be sent for that process. Thus, a HARQ process suspended in the manner described above can be resumed by an adaptive uplink grant indicating a retransmission, i.e., having the same new-data indicator (NDI) value.

This particular mechanism for suspending a HARQ process upon receipt of a CQI-only indicator may be implemented in two ways. First, the ACK could be sent by the eNodeB over the PHICH and forwarded by the physical layer to the MAC layer. Alternatively, the ACK message could be locally generated by the physical layer upon reception of an uplink grant for a CQI-only transmission. This latter approach avoids conflicting behavior of MAC and physical layer in case of errors in receiving the control signaling.

However, an obvious drawback of suspending the HARQ process by indicating an ACK is that this approach requires an adaptive uplink grant to be sent on PDCCH to resume the uplink transmission. This costs scarce layer 1/layer 2 control signaling resources, and increases error probabilities.

Another proposed approach is to configure the base station so that it does not prohibit multiplexing of data from a stop-and-wait process if there is a pending retransmission. In other words, the base station avoids sending a CQI-only indicator if there is a pending non-adaptive retransmission for the corresponding HARQ process. One drawback of this approach is that the transmission delay of the information elements may be increased.

SUMMARY

Disclosed herein are methods and apparatus for controlling synchronous hybrid automatic repeat request (HARQ) retransmissions, in which non-adaptive retransmissions scheduled for a first transmission time interval are automatically deferred to a later transmission time interval in the event that a CQI-only grant is received for the first transmission time interval. This approach avoids a complete suspension of the HARQ process and thus does not require an adaptive uplink grant to be sent to resume the HARQ process. In several of the embodiments described hereafter, these techniques are completely transparent to the MAC layer, thus simplifying implementation of the MAC protocols.

In an exemplary method, such as might be implemented in a in a wireless communications device having a control circuit configured to implement a medium access control function and a physical layer function, a NACK message is received in response to a previous data transmission corresponding to a stop-and-wait HARQ process, and a synchronous HARQ retransmission is scheduled for a first transmission interval, responsive to the first NACK message. A control message indicating that data for the stop-and-wait HARQ process may not be sent during the first transmission interval is received, and the synchronous HARQ retransmission is automatically deferred to a second transmission interval, responsive to the control message. An explicit grant is not required to trigger the retransmission during the second transmission interval.

The automatic deferral of the synchronous HARQ retransmission to the second transmission interval may be performed in several ways. In each of several embodiments of the present invention, the medium access control function prepares a retransmission block for the stop-and-wait HARQ process and supplies the retransmission block to the physical layer function. The physical layer function determines that the control message prohibits transmission of the retransmission block during the first transmission interval, and thus refrains from transmitting the retransmission block during the first transmission interval. In some embodiments, the medium access control function detects that no HARQ feedback corresponding to the retransmission block is received, and schedules the synchronous HARQ retransmission of the transport block for the second transmission interval, responsive to said detecting. In others, the medium access control function is configured to retain HARQ feedback for each process until new feedback for that process is received, and detects that the most recent previous HARQ feedback corresponding to the stop-and-wait HARQ process is a NACK message, thus automatically scheduling the synchronous HARQ retransmission of the transport block for the second transmission interval responsive to said detecting. In still others, the physical layer sends a second NACK message, corresponding to the first transmission interval, to the medium access control function, triggering the medium access control function to schedule the synchronous HARQ retransmission of the transport block for the second transmission interval in response to detecting the second NACK message.

In some embodiments, the control message is included in a resource grant message that corresponds to the first transmission interval and indicates that only physical layer information elements may be transmitted during the first transmission interval. In some of these embodiments the resource grant message indicates that only channel quality data may be transmitted during the first transmission interval. In several embodiments, the stop-and-wait process is one of a plurality of stop-and-wait HARQ processes for an uplink session between the wireless communication device and an LTE Evolved Node-B.

Also described herein are various embodiments of a wireless communication device configured to control synchronous HARQ retransmissions according to one or more of the methods described above. Several embodiments comprise a control circuit configured to implement a medium access control function and a physical layer function, wherein the control circuit is configured to receive a NACK message in response to a previous data transmission corresponding to a stop-and-wait HARQ process and to schedule a synchronous HARQ retransmission for a first transmission interval, responsive to the NACK message. The control circuit in these embodiments is further configured to receive a control message indicating that data for the stop-and-wait HARQ process may not be sent during the first transmission interval, and to automatically defer the synchronous HARQ retransmission to a second transmission interval, responsive to the control message. The automatic deferring of the synchronous HARQ retransmissions may be performed according to any of the techniques described above.

Of course, those skilled in the art will appreciate that the present invention is not limited to the above contexts, benefits, or specific examples, and will recognize additional features, contexts, and advantages upon reading the followed detailed description and upon viewing the accompanying drawings.

DETAILED DESCRIPTION

In much of the discussion that follows, various embodiments and aspects of the present invention are described in the context of an LTE system. Of course, those skilled in the art will appreciate that the techniques and apparatus disclosed herein may be applied to or adapted for other wireless systems, including (but not limited to) Wideband-CDMA, WiMax, and Ultra Mobile Broadband (UMB) systems. Those skilled in the art will also recognize that the inventive techniques are not limited to use in controlling uplink (mobile-to-base station) HARQ processes, although many of the illustrative examples provided herein are based on LTE uplink HARQ processing. Indeed, the techniques described herein may be applied to the control of downlink (base station-to-mobile) ARQ processes as well as to ARQ processes between peer devices in a peer-to-peer wireless communication system.

The use of the term "exemplary" is used herein to mean "illustrative," or "serving as an example," and is not intended to imply that a particular embodiment is preferred over another or that a particular feature is essential to the present invention. Likewise, the terms "first" and "second," and similar terms, are used simply to distinguish one particular instance of an item or feature from another, and do not indicate a particular order or arrangement unless the context clearly indicates otherwise.

Figure 1:
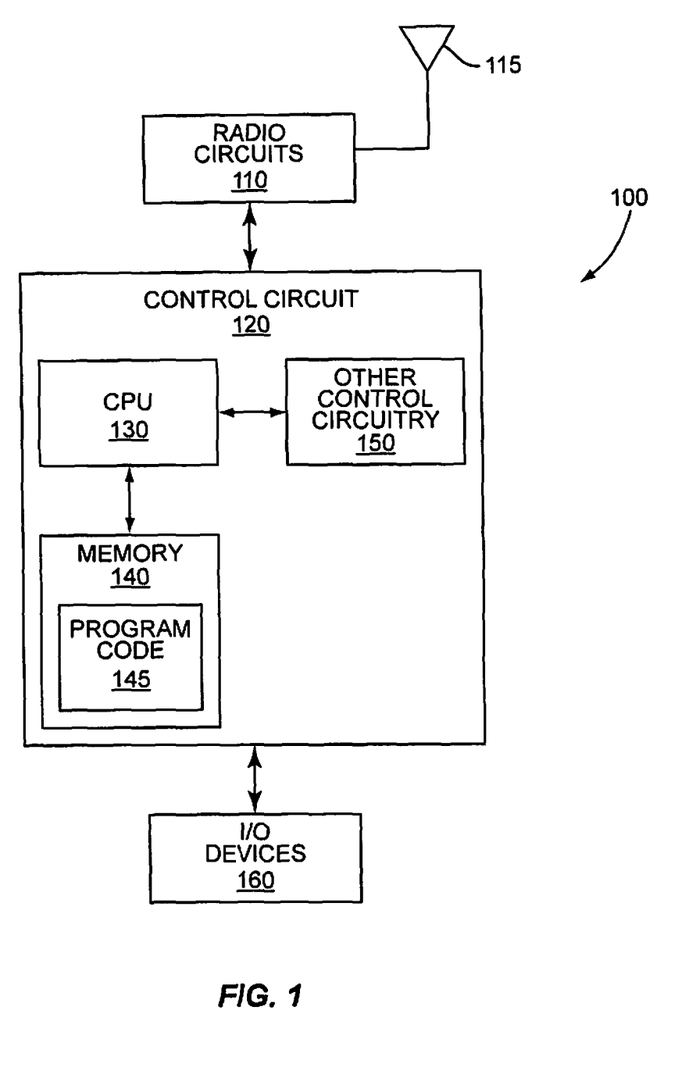
FIG. 1 is a block diagram of a wireless communication device according to some embodiments of the invention.

FIG. 1 is a block diagram of an exemplary wireless communications device 100 according to some embodiments of the present invention. Wireless device includes radio circuits 110, coupled to antenna 115 and control circuit 120, which in turn is coupled to input/output (I/O) devices 160. Control circuit 120 comprises a central processing unit 130, memory 140, and other control circuitry 150. Control circuit 120 executes the program code 145 stored in memory 140, using CPU 130, thereby controlling the operation of the wireless communications device 100. The wireless communications device 100 receives signals input by a user and outputs images and sounds through the I/O devices 160, which may include a keypad, microphone, one or more displays, speakers, and the like. Radio circuits 110 are configured to receive and transmit wireless signals, delivering received signals to the control circuit 120 and outputting signals generated by the control circuit 120 to the antenna 115 for transmission. Control circuit 120 and radio circuits 110 may be configured to operate according to one or more wireless communication standards, such as according to the LTE specifications promulgated by the $3^{rd}$-Generation Partnership Project (3GPP).

Of course, the block diagram of FIG. 1 is simplified; a number of features and elements not necessary to a complete understanding of the present invention are omitted. Those skilled in the art will appreciate that the control circuit 120 may comprise one or several microprocessors, microcontrollers, digital signal processors, and the like, each of which may be configured with appropriate software and/or firmware, and may further comprise various digital hardware blocks configured to carry out various signal processing tasks. Control circuit 120 may be implemented with one or more application-specific integrated circuits (ASICs), off-the-shelf digital and analog hardware components, or some combination of ASICs and off-the-shelf hardware. Memory 140 may include several different types, including, but not limited to, flash, read-only memory (ROM), random-access memory (RAM), cache memory, etc., and may be implemented completely or partially on-board one or more ASICs, or using memory devices separate from CPU 130 and other control circuitry 150, or with some combination of these approaches.

Viewed from the perspective of a communications protocol framework, the radio circuits 110 embody a portion of Layer 1 (the physical layer, or "PHY" layer), while the control circuit 120 embodies the remainder of Layer 1 as well as functions of Layer 2 (data link layer) and Layer 3 (network layer). This can be seen in FIG. 2, which illustrates the functional elements of an exemplary control circuit 120. Thus, control circuit 120 embodies an application layer 210, a network layer 220, and a radio link control (RLC) entity 230, each of which may be configured to operate according to one or more conventional communications standards. Control circuit 120 further embodies a medium access control (MAC) function 240, which is coupled to a physical layer control function 260. Those skilled in the art will appreciate that each of the illustrated functional elements of control circuit 120 may be implemented by means of CPU 130 (or other processor or processors) executing program code 145, or using one or more appropriately configured hardware blocks, or some combination thereof.

Figure 2:
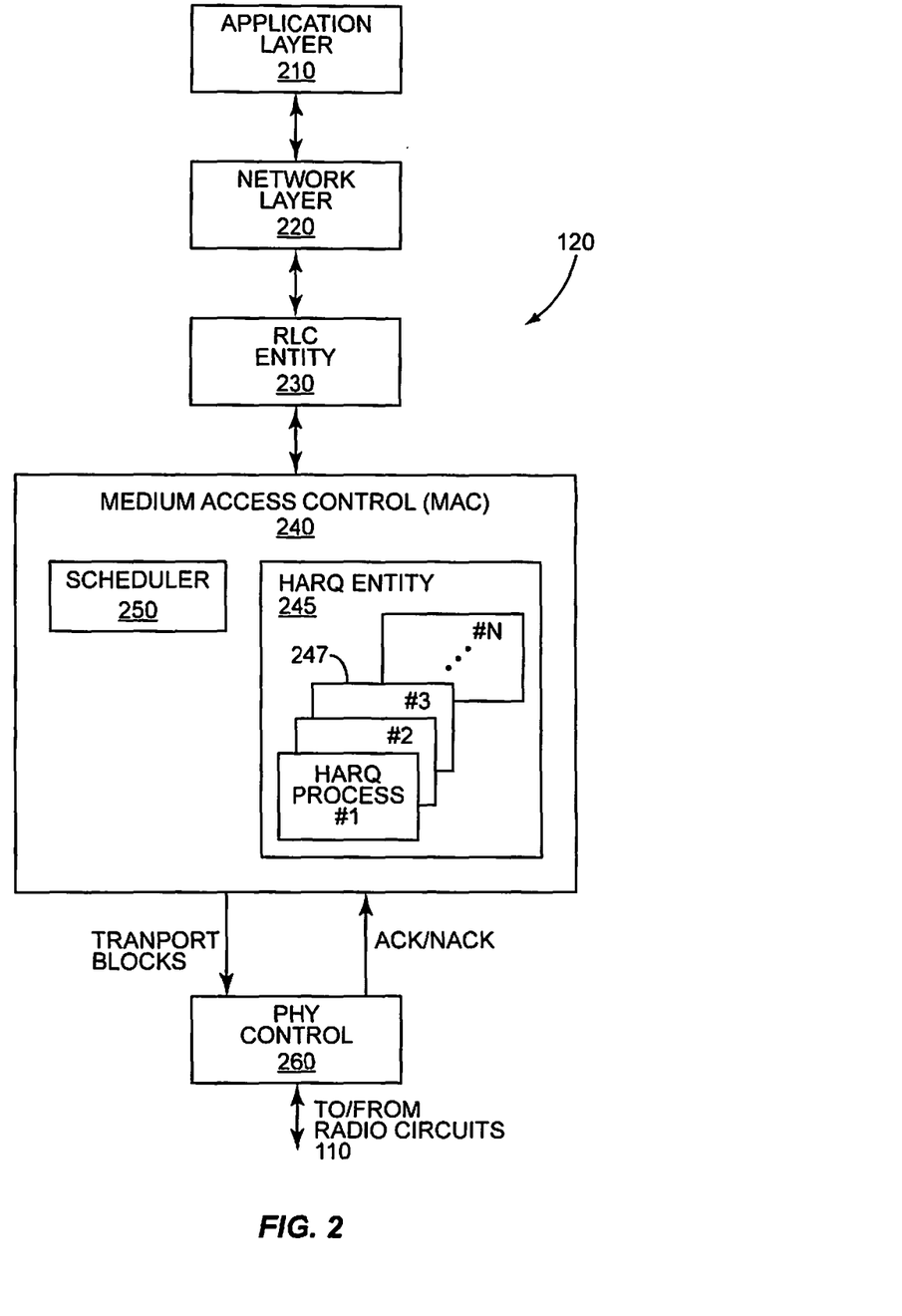
FIG. 2 illustrates functional elements of an exemplary control circuit according to some embodiments of the invention.

Those skilled in the art will further appreciate that the RLC entity 230 and MAC function 240 are typically viewed as corresponding to Layer 2 of the Open System Interconnection (OSI) model. RLC entity 230 provides segmentation, reassembly, concatenation, padding, retransmission, sequence check, and duplication detection on transmitted data or control instructions, depending on transmission quality requirements. Among other functions, MAC function 240 multiplexes packets received from different logical channels of the RLC entity 240 to common, shared, or dedicated transport channels according to radio resource allocation commands and transmission format information managed by scheduler 250, and de-multiplexes transport blocks received from the physical layer 260 to the appropriate RLC logical channels.

Of course, the detailed operation of the RLC entity 230, MAC function 240, and PHY layer control function 260 will vary depending on the standard or standards supported by a given wireless communication device. Details of the 3GPP LTE requirements for operation of the PHY and MAC layers are given in the 3GPP documents: "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321, and "3rd Generation Partnership Project; Technical Specification Group Radio Access Network; Evolved Universal Terrestrial Radio Access (E-UTRA); Physical Layer Procedures (Release 8)", 3GPP TS 36.213, respectively. An overall description of the LTE radio access network is provided in "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300.

As discussed above, an LTE base station sends feedback to the mobile terminal in response to each uplink data transmission, indicating the successful or unsuccessful reception of the data associated with the corresponding HARQ process. As seen in FIG. 2, the mobile terminal manages a plurality of HARQ processes 247, using HARQ entity 245. If the eNodeB could not correctly decode received data for the process, it sends a negative acknowledgement (NACK) using physical layer control signaling. Once the physical layer entity 260 at the mobile terminal delivers this NACK to the MAC layer 240, the MAC layer 240 prepares a synchronous non-adaptive retransmission for the HARQ process 247, and delivers the corresponding data to the physical layer 260 for transmission.

In the meantime, however, the base station may have decided to request an information element such as a channel quality information report from the terminal. Due to limited transmission resources it may in some cases decide to suspend the pending HARQ non-adaptive retransmission. It does this by requesting a so-called CQI-only report, which prohibits the terminal from multiplexing the channel quality information report with the pending retransmission data. As explained above, this indicator is also transmitted using physical layer control signaling and it is received and processed by the physical layer entity 260 in the mobile terminal.

In various embodiments of the invention, the received feedback (ACK/NACK) is passed from the physical layer 260 to the MAC layer 240 regardless of whether information elements have been requested and regardless of whether multiplexing of the requested information elements with HARQ process data is permitted. As a result, the MAC layer 240 will prepare a synchronous non-adaptive retransmission for a particular HARQ process 247 if a NACK corresponding to that process is received (and if no adaptive retransmission is signaled via a PDCCH grant message.) The retransmission block prepared by the MAC layer 240 is then delivered to the PHY control layer 260 for transmission, as per the "normal" case. However, in these embodiments the PHY control layer 260 discards the retransmission block when transmission is prohibited by multiplexing constraints. This approach hides the multiplexing constraints from the MAC layer 240. To avoid the need for a grant message signaling resumption of a suspended HARQ process, control circuit 120 is configured to automatically defer the synchronous non-adaptive retransmission to a later interval. Thus, the HARQ retransmission is merely deferred in response to a conflict between the non-adaptive retransmission and receipt of a CQI-only message, and not fully suspended.

The deferred retransmission attempt may be triggered in a number of different ways. In some embodiments, the MAC layer 240 may be configured to detect that HARQ feedback was not received for a given retransmission attempt (because the PHY layer 260 discarded the retransmission block), and to automatically re-schedule a non-adaptive retransmission for the next transmission time interval for the corresponding HARQ process 247. In other embodiments, the physical layer entity 260 is modified so that it stores the NACK message received in response to the earlier transmission (i.e., the NACK message that triggered the first retransmission attempt) and delivers it to the MAC layer 240 upon the next transmission opportunity for the corresponding process. In these embodiments, the MAC layer 240 remains unaware that the previous retransmission block was not actually transmitted by the physical layer 260, since it simply detects a NACK in response. Alternatively, the MAC layer 240 may be specified in a way so that it retains the most recently received ACK/NACK message for each HARQ process 247 and so that the HARQ entity 245 prepares re-transmissions for a pending process once each round trip time if the last received feedback was a NACK. With each of these approaches, the impact to the MAC layer 240 is minimized, or even eliminated entirely.

Figure 3:
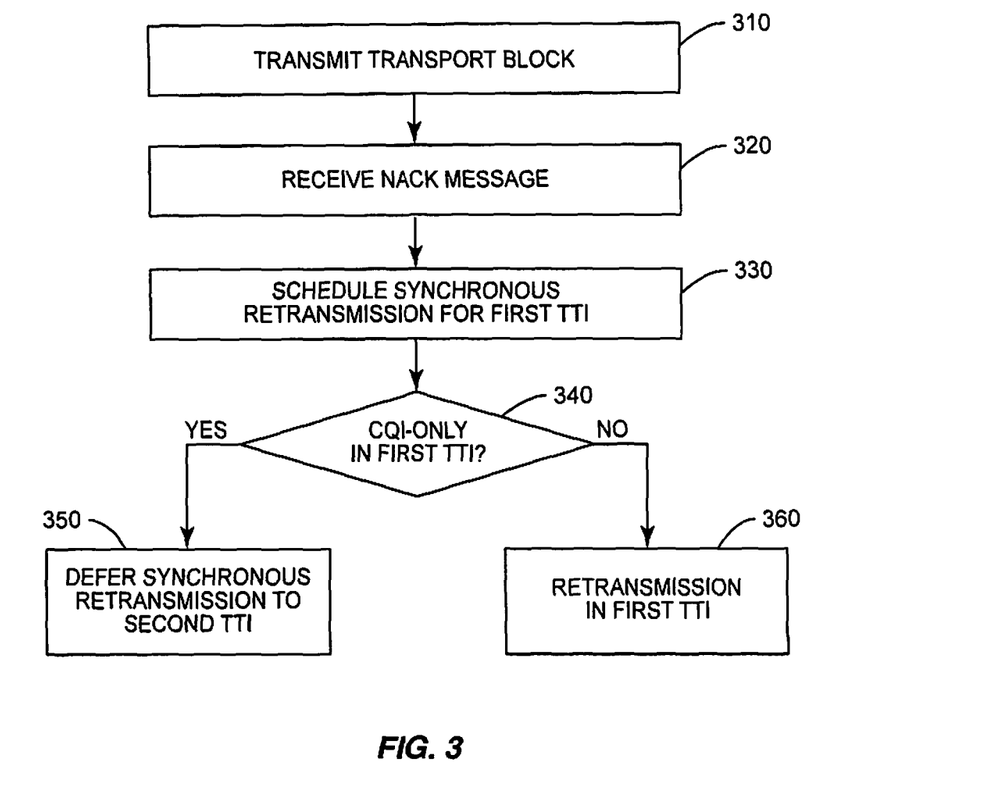
FIG. 3 is a flowchart of an exemplary process for controlling synchronous hybrid automatic repeat request retransmissions in a wireless communications device.

FIG. 3 is a process flow diagram illustrating generally a method for controlling synchronous HARQ retransmissions in a wireless communication device. The pictured method, which is a generalization of the techniques described in detail above, may be implemented using a control circuit configured to implement a MAC function and a physical layer function, such as the control circuit 120, MAC function 240, and physical layer control function 260 discussed above. However, those skilled in the art will appreciate that the process pictured in FIG. 6 may be implemented in devices configured for operation in wireless networks other than LTE, and is not limited to application in mobile terminals.

In any event, the method illustrated in FIG. 3 begins with the transmission of a transport block corresponding to a given stop-and-wait HARQ process, as shown at block 310, and the receipt of a NACK message, in response. In the usual case, the NACK message is received from the remote node, and indicates that the remote node was unable to successfully decode the transport block. However, those skilled in the art will appreciate that some wireless devices may be configured to locally generate a NACK message under some circumstances, such as if a transmission conflicts with a higher priority radio task such as a measurement task. In either event, however, the MAC layer "receives" a NACK, and may generally remain unaware of whether or not the transport block was actually transmitted over the air.

In any case, the process illustrated at FIG. 3 continues, as shown at block 330, with the scheduling of a synchronous retransmission, in response to the NACK, for a first transmission time interval corresponding to the pending HARQ process. The MAC layer thus prepares a retransmission block and sends it to the PHY layer for transmission.

At block 340, the PHY layer determines whether or not a CQI-only control message (or other control message indicating that data for the HARQ process may not be sent during the first transmission time interval) has been received. If no such message is received, then the non-adaptive retransmission is completed, during the first transmission time interval, as shown at block 360. If such a message is received, however, then the synchronous retransmission is automatically deferred to a second transmission time interval, e.g., the next available transmission time interval corresponding to that HARQ process.

Figure 4A:
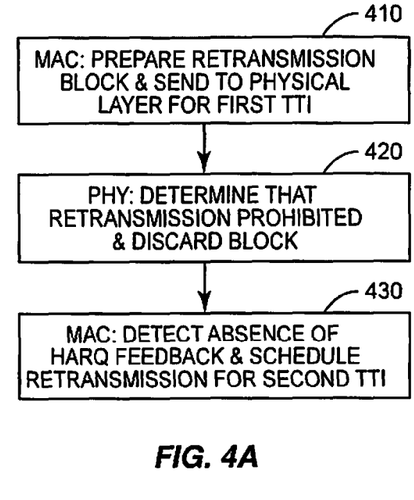
FIGS. 4a, 4b, and 4c are flowcharts illustrating exemplary processes for automatically deferring a synchronous HARQ retransmission from a first transmission time interval to a second transmission time interval, according to several embodiments of the invention.
Figure 4B:
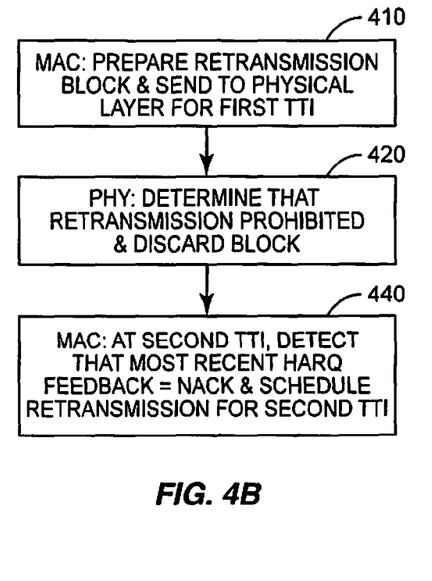
Figure 4C:
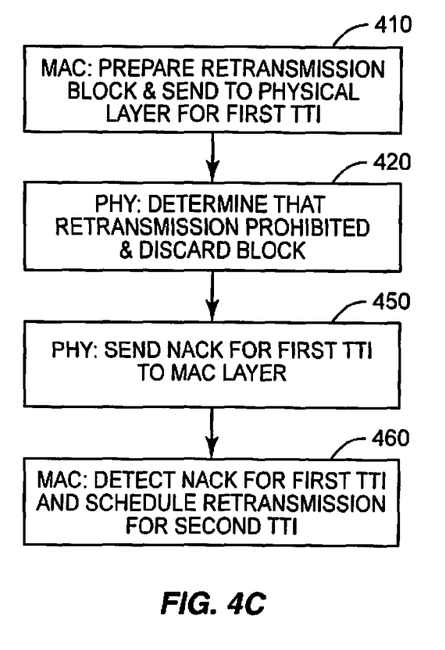

FIGS. 4A, 4B, and 4C illustrate additional details of three techniques for automatically deferring a synchronous HARQ retransmission to a second transmission interval, responsive to a control message indicating that the retransmission may not be sent during the originally planned first transmission interval. Again, any of these techniques may be implemented in any of the wireless communication devices discussed above.

Each of the illustrated process flows begins with the preparation of a retransmission block by the MAC layer, in response to a NACK message corresponding to an earlier transmission attempt for a given stop-and-wait HARQ process, as shown at block 410. The retransmission block is forwarded to the physical layer for transmission in the first transmission time interval, i.e., the next transmission time interval corresponding to the HARQ process. Next, as shown at block 420 in each of the flow diagrams of FIGS. 4A, 4B, and 4C, the physical layer determines that transmission of the retransmission block during the first transmission interval is prohibited, e.g., by detecting a CQI-only message or other control message(s) requesting information elements and prohibiting the multiplexing of process data with the requested information elements. In response to this message, the physical layer refrains from transmitting the retransmission block during the first transmission interval, e.g., by simply discarding the block.

As noted earlier, the MAC layer in some embodiments of the invention may be configured to detect the absence of HARQ feedback corresponding to the retransmission attempt, and to automatically re-schedule the retransmission for the next appropriate time interval in response to this detection. This approach is shown at block 430 of FIG. 4A. In some alternative embodiments, the MAC layer is instead configured to retain the most recent HARQ feedback for each HARQ process, and to use this information in determining whether another retransmission attempt is required. This approach is illustrated at block 440 of FIG. 4B. Thus, when preparing for the second transmission time interval, which corresponds to the pending HARQ process, the MAC layer determines that the most recent previous HARQ feedback corresponding to the stop-and-wait HARQ process is a NACK message, and automatically re-schedules another HARQ retransmission of the transport block for the second transmission interval. As suggested above, the MAC layer need not be aware that the stored NACK message was originated in response to the original transmission attempt (i.e., at block 310 of FIG. 3), rather than in response to the earlier retransmission attempt (at block 410) at the first transmission interval.

Yet another approach is illustrated at blocks 450 and 460 of FIG. 4C. In this variation, the physical layer, in response to determining that the retransmission attempt in the first transmission interval is prohibited, generates a NACK message corresponding to the retransmission attempt (or retrieves a stored NACK message received in response to the original transmission) and sends it to the MAC layer. The MAC layer receives this NACK message and uses it in preparing for the second transmission interval, as shown at block 460. Thus, the MAC layer automatically schedules another retransmission attempt for the pending HARQ process for the second transmission interval.

As noted above, the control message that prohibits transmission of the HARQ process data during the first transmission interval may be a so-called CQI-only message, or other message that indicates that HARQ process data may not be multiplexed with information elements requested from the physical layer. In some embodiments, this control message may be included in a resource grant message (e.g., transmitted over the LTE PDCCH) corresponding to the first transmission interval but indicating that only physical layer information elements, such as channel quality data, may be transmitted during that interval.

Those skilled in the art will appreciate that the techniques described above may be applied in various systems that employ one or a plurality of stop-and-wait processes, and may be used in one direction only, such as for an uplink session between a mobile terminal and an LTE Evolved Node-B, or in both directions. Indeed, those skilled in the art will recognize that the present invention may be carried out in various other ways than those specifically set forth herein without departing from essential characteristics of the invention. Accordingly, the presently described embodiments are to be considered in all respects as illustrative and not restrictive, and all changes coming within the meaning and equivalency range of the appended claims are intended to be embraced therein.

What is claimed is:

1. A method for controlling synchronous hybrid automatic repeat request, HARQ, retransmissions in a wireless communications device having a control circuit configured to implement a medium access control function and a physical layer function, the method comprising:
receiving a first NACK message in response to a previous data transmission corresponding to a stop-and-wait HARQ process; and
scheduling a synchronous HARQ retransmission for a first transmission time interval, responsive to the first NACK message;
receiving a control message indicating that the wireless communication device shall not send data for the stop-and-wait HARQ process during the first transmission time interval; and
automatically deferring the synchronous HARQ retransmission to a second transmission time interval, responsive to the control message.

2. The method of claim 1, wherein automatically deferring the synchronous HARQ retransmission to the second transmission time interval comprises:
preparing, using the medium access control function, a retransmission block for the stop-and-wait HARQ process and supplying the retransmission block to the physical layer function;
determining, using the physical layer function, that the control message prohibits transmission of the retransmission block during the first transmission time interval and refraining from transmitting the retransmission block during the first transmission time interval in response to said determining; and
detecting, using the medium access control function, that no HARQ feedback corresponding to the retransmission block is received and scheduling the synchronous HARQ retransmission of the transport block for the second transmission time interval, responsive to said detecting.

3. The method of claim 1, wherein automatically deferring the synchronous HARQ retransmission to the second transmission time interval comprises:
preparing, using the medium access control function, a retransmission block for the stop-and-wait HARQ process and supplying the retransmission block to the physical layer function;
determining, using the physical layer function, that the control message prohibits transmission of the retransmission block during the first transmission time interval and refraining from transmitting the retransmission block during the first transmission time interval in response to said determining; and
detecting, using the medium access control function, that the most recent previous HARQ feedback corresponding to the stop-and-wait HARQ process is a NACK message and scheduling the synchronous HARQ retransmission of the transport block for the second transmission time interval responsive to said detecting.

4. The method of claim 1, wherein automatically deferring the synchronous HARQ retransmission to the second transmission time interval comprises:
preparing, using the medium access control function, a retransmission block for the stop-and-wait HARQ process and supplying the retransmission block to the physical layer function;
determining, using the physical layer function, that the control message prohibits transmission of the retransmission block during the first transmission time interval and, in response to said determining, refraining from transmitting the retransmission block during the first transmission time interval and sending a second NACK message, corresponding to the first transmission time interval, from the physical layer function to the medium access control function;
detecting the second NACK message, using the medium access control function, and scheduling the synchronous HARQ retransmission of the transport block for the second transmission time interval, responsive to detecting the second NACK message.

5. The method of claim 1, wherein the control message is included in a resource grant message corresponding to the first transmission time interval and indicating that only physical layer information elements may be transmitted during the first transmission time interval.

6. The method of claim 5, wherein the resource grant message indicates that only channel quality data may be transmitted during the first transmission time interval.

7. The method of claim 1, wherein the stop-and-wait HARQ process is one of a plurality of stop-and-wait HARQ processes for an uplink session between the wireless communication device and a Long Term Evolution (LTE) Evolved Node-B.

8. A wireless communication device comprising a control circuit configured to implement a medium access control function and a physical layer function, wherein the control circuit is configured to:
- receive a NACK message in response to a previous data transmission corresponding to a stop-and-wait HARQ process;
- schedule a synchronous HARQ retransmission for a first transmission time interval, responsive to the NACK message;
- receive a control message indicating that the wireless communication device shall not send data for the stop-and-wait HARQ process during the first transmission time interval; and
- automatically defer the synchronous HARQ retransmission to a second transmission time interval, responsive to the control message.

9. The wireless communication device of claim 8, wherein the control circuit is configured to automatically defer the synchronous HARQ retransmission to the second transmission time interval by:
- preparing, using the medium access control function, a retransmission block for the stop-and-wait HARQ process and supplying the retransmission block to the physical layer function;
- determining, using the physical layer function, that the control message prohibits transmission of the retransmission block during the first transmission time interval and refraining from transmitting the retransmission block during the first transmission time interval in response to said determining; and
- detecting, using the medium access control function, that no HARQ feedback corresponding to the retransmission block is received and scheduling the synchronous HARQ retransmission of the transport block for the second transmission time interval, responsive to said detecting.

10. The wireless communication device of claim 8, wherein the control circuit is configured to automatically defer the synchronous HARQ retransmission to the second transmission time interval by:
- preparing, using the medium access control function, a retransmission block for the stop-and-wait HARQ process and supplying the retransmission block to the physical layer function;
- determining, using the physical layer function, that the control message prohibits transmission of the retransmission block during the first transmission time interval and refraining from transmitting the retransmission block during the first transmission time interval in response to said determining; and
- detecting, using the medium access control function, that the most recent previous HARQ feedback corresponding to the stop-and-wait HARQ process is a NACK message and scheduling the synchronous HARQ retransmission of the transport block for the second transmission time interval responsive to said detecting.

11. The wireless communication device of claim 8, wherein the control circuit is configured to automatically defer the synchronous HARQ retransmission to the second transmission time interval by:
- preparing, using the medium access control function, a retransmission block for the stop-and-wait HARQ process and supplying the retransmission block to the physical layer function;
- determining, using the physical layer function, that the control message prohibits transmission of the retransmission block during the first transmission time interval and, in response to said determining, refraining from transmitting the retransmission block during the first transmission time interval and sending a second NACK message, corresponding to the first transmission time interval, from the physical layer function to the medium access control function;
- detecting the second NACK message, using the medium access control function, and scheduling the synchronous HARQ retransmission of the transport block for the second transmission time interval, responsive to detecting the second NACK message.

12. The wireless communication device of claim 8, wherein the control message is included in a resource grant message corresponding to the first transmission time interval and indicating that only physical layer information elements may be transmitted during the first transmission time interval.

13. The wireless communication device of claim 12, wherein the resource grant message indicates that only channel quality data may be transmitted during the first transmission time interval.

14. The wireless communication device of claim 8, wherein the control circuit is configured to maintain a plurality of stop-and-wait HARQ processes for an uplink session between the wireless communication device and a Long Term Evolution (LTE) Evolved Node-B.

* * * * *

UNITED STATES PATENT AND TRADEMARK OFFICE
CERTIFICATE OF CORRECTION

| | |
|---|---|
| PATENT NO. | : 8,578,232 B2 |
| APPLICATION NO. | : 13/059843 |
| DATED | : November 5, 2013 |
| INVENTOR(S) | : Jöngren et al. |

It is certified that error appears in the above-identified patent and that said Letters Patent is hereby corrected as shown below:

In the Specification

In Column 6, Line 17, delete "entity 240" and insert -- entity 230 --, therefor.

Signed and Sealed this
Fourth Day of March, 2014

Michelle K. Lee
*Deputy Director of the United States Patent and Trademark Office*